(12) United States Patent
Müller et al.

(10) Patent No.: US 11,916,452 B2
(45) Date of Patent: Feb. 27, 2024

(54) STATOR WINDING SYSTEM WITH SERIAL COIL WINDING

(71) Applicants: Torsten Müller, Gerhardshofen (DE); Harald Müller, Gerhardshofen (DE)

(72) Inventors: Torsten Müller, Gerhardshofen (DE); Harald Müller, Gerhardshofen (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 252 days.

(21) Appl. No.: 17/198,220

(22) Filed: Mar. 10, 2021

(65) Prior Publication Data
US 2021/0305867 A1    Sep. 30, 2021

(30) Foreign Application Priority Data

Mar. 26, 2020 (DE) .................. 10 2020 203 945.3

(51) Int. Cl.
| | | |
|---|---|---|
| H02K 3/00 | (2006.01) | |
| H02K 1/00 | (2006.01) | |
| H02K 1/14 | (2006.01) | |
| H02K 1/16 | (2006.01) | |
| H02K 3/28 | (2006.01) | |

(52) U.S. Cl.
CPC .............. *H02K 3/28* (2013.01); *H02K 1/148* (2013.01); *H02K 1/165* (2013.01)

(58) Field of Classification Search
CPC .......... H02K 3/28; H02K 1/148; H02K 1/165; H02K 2203/09; H02K 3/14; H02K 3/522; H02K 21/16; H02K 3/18; H02K 15/095
See application file for complete search history.

(56) References Cited

U.S. PATENT DOCUMENTS

| | | | | |
|---|---|---|---|---|
| 7,245,055 B2* | 7/2007 | Jack | ............. | H02K 1/148 310/216.013 |
| 7,821,165 B2* | 10/2010 | Yamane | ............. | H02K 3/18 310/179 |
| 2007/0252447 A1* | 11/2007 | Ionel | ............. | H02K 29/03 310/44 |
| 2008/0129140 A1* | 6/2008 | Ionel | ............. | H02K 1/148 310/216.009 |

FOREIGN PATENT DOCUMENTS

| | | |
|---|---|---|
| DE | 102007027896 A1 | 12/2008 |
| DE | 112006000061 T5 | 5/2009 |
| DE | 102014100410 A1 | 7/2014 |
| JP | 2014108029 A | 6/2014 |

OTHER PUBLICATIONS

JP 2014108029 A (Year: 2014).*
German Search Report for German Application No. 10 2020 203 945.3 dated Jul. 31, 2020.

* cited by examiner

*Primary Examiner* — Thomas Truong
(74) *Attorney, Agent, or Firm* — Lempia Summerfield Katz LLC

(57) ABSTRACT

A stator winding system for a stator of an electric machine is provided. The stator has a number of windings to be positioned on stator teeth of the stator. At least two windings that follow one another in a current flow direction of an electric current and are thus arranged in series are formed from an electric conductor that is continuous in the current flow direction, forming a winding chain.

15 Claims, 4 Drawing Sheets

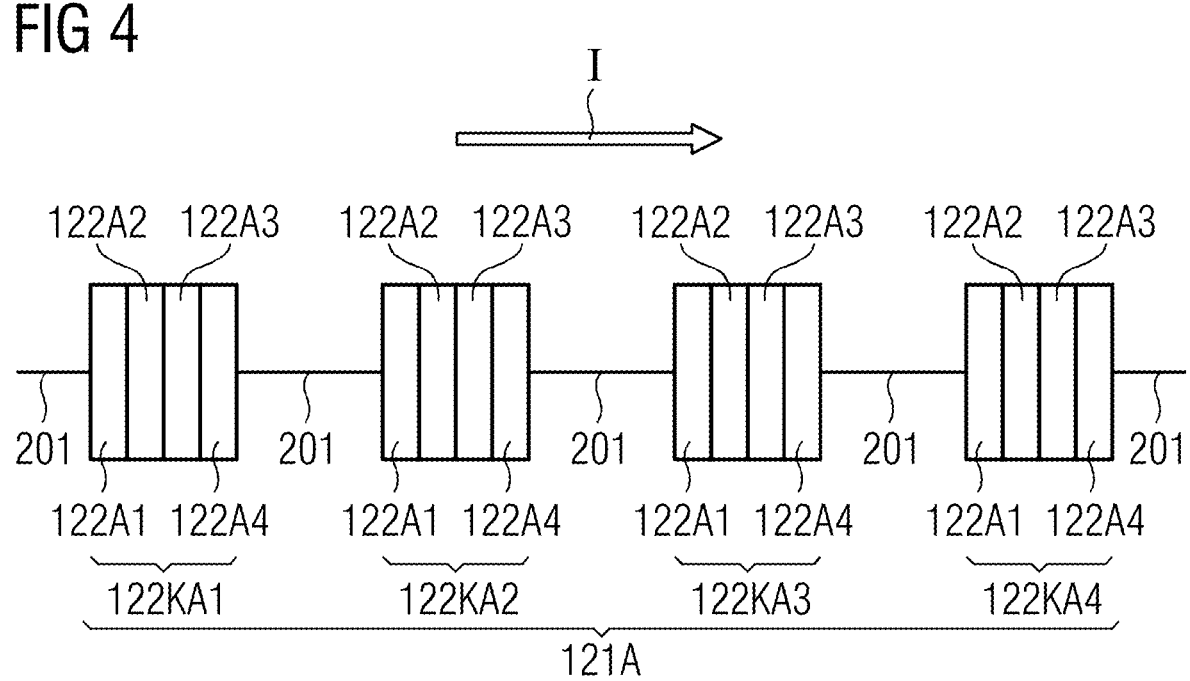

STATOR WINDING SYSTEM WITH SERIAL COIL WINDING

This application claims the benefit of German Patent Application No. DE 10 2020 203 945.3, filed on Mar. 26, 2020, which is hereby incorporated by reference in its entirety.

BACKGROUND

The present embodiments relate to an electric machine that may be used as an electric motor or as an electric generator for a drive system. For example, the present embodiments are directed to a stator of an electric machine of this kind and, more specifically, to the windings provided in or on the stator.

As alternatives to customary internal combustion engines, concepts based on electric drive systems are being investigated and used for mobile applications (e.g., for driving aircraft, such as airplanes or helicopters), or else for electrically driven land vehicles or watercraft, etc. An electric drive system of this kind, which may be configured as a purely electric or as a hybrid-electric drive system, generally has at least one electric machine that is operated as an electric motor for driving the propulsion means of the aircraft. Further, an appropriate source of electrical energy for supplying the electric motor and generally a power electronics system, with the aid of which the electric motor is operated, are provided. In a hybrid-electric drive system, an internal combustion engine that is integrated into the drive system in series or in parallel and drives, for example, a generator that provides electrical energy that may be stored in a battery and/or fed to the electric motor is further provided.

The demands placed on electric machines of this kind are increasing continuously, very largely independently of the respective application. Owing to the constant optimization of electric machines, especially with regard to power density, the overall size and the space required for components are to be reduced as far as possible. In a conventional single-tooth configuration of the stator of the machine, however, the individual windings are to be electrically connected to one another, which, for machines with high numbers of pole pairs and thus a high number of individual windings, is associated with a high expenditure of time and with a correspondingly complex and comparatively heavy apparatus.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the construction and production of a stator winding system is simplified.

A stator winding system for a stator of an electric machine includes a number of windings that may be positioned on stator teeth of the stator. At least two windings that follow one another in a current flow direction of an electric current flowing through the winding system are arranged in series, forming a winding chain, while being formed from an electric conductor that is continuous in the current flow direction. In other words, such a winding chain thus includes a number of individual windings, where this winding chain is formed from a continuous electric conductor.

The feature that the conductor is "continuous" provides, for example, that the windings thus formed and the winding chain are not connected by separate intermediate pieces connected between the windings, but are wound from one piece of wire.

The stator winding system is configured for the application of a single-phase or multi-phase electric current and, for this purpose, has a number of sub-winding systems corresponding to the number of phases of the current. Each sub-winding system includes at least one of the winding chains.

The term "application" of electric current is explicitly intended to include not only the case in which the stator winding system and hence also the various windings thereof are supplied with the electric current from an external power source, for example, as is the case, for example, in the operating state of the electric machine as an electric motor. The reverse case, where the machine operates as a generator, for example, and the "application" of electric current consists of currents being induced in the windings by virtue of the known electromagnetic interaction, is also intended to be included.

In this case, each sub-winding system may have a number of winding chains connected in series in the current flow direction. In this case, the winding chains of a respective sub-winding system may be electrically connected to one another via an interconnection unit assigned to the stator winding system.

Each winding chain may have a pair of electric terminals for application of the electric current. The interconnection unit has paired contact points or pairs of contact points, by which the interconnection unit may be electrically connected to the terminal pair of the respective winding chain. In this case, the two contact points of a respective pair are not electrically connected to one another as long as the two contact points are not connected to the terminal pair of a respective winding chain. Electrical connections are provided on or in the interconnection unit, which, in each case, connect one of the contact points of a first pair of contact points to one of the contact points of a second pair of contact points, with the result that a winding chain, arranged at the first pair of contact points, of one of the sub-winding systems is electrically connected to a further winding chain, arranged at the second pair of contact points, of the same sub-winding system. With the aid of the interconnection unit, the construction of the sub-winding systems may accordingly be effected in a simple manner by interconnecting the winding chains.

The contact points of the interconnection unit and the terminals of the winding chains may be configured to match such that the contact points and the terminals may be plugged onto one another. This greatly simplifies the assembly of the stator winding system.

In a method for producing a stator winding system of this kind for a stator of an electric machine, the method includes producing a required number of winding chains, each with a plurality of individual windings, by shaping the continuous electric conductor for each winding chain such that the continuous electric conductor forms the plurality of windings of the respective winding chain.

The stator winding system is configured for the application of a single-phase or multi-phase electric current and, for this purpose, is fitted with a number of sub-winding systems corresponding to the number of phases of the current, where each sub-winding system is fitted with at least one of the winding chains.

Each sub-winding system may also be fitted with a number of winding chains connected in series in the current flow direction.

The winding chains of a respective sub-winding system may be electrically connected to one another via an interconnection unit assigned to the stator winding system in order in this way to form the respective sub-winding system.

After production of the winding chains, the interconnection unit is plugged onto electric terminals of the respective winding chain, which the respective winding chain has for application of the electric current, in order to electrically connect the winding chains of a respective sub-winding system to one another.

In one embodiment, the interconnection unit is only plugged onto the terminals after the winding chains have been positioned on the stator teeth.

The winding chains may be positioned on the stator teeth by winding the continuous electric conductor directly onto the respective stator teeth.

Alternatively, the windings of the respective winding chain may first be formed into air coils in a first act. The air coils formed in this way are positioned on the respective stator teeth in a second act.

In another alternative, the winding chains may be produced by a needle winding process.

The concept underlying the present embodiments is to wind a plurality of individual windings of a stator winding system that are to be connected in series directly from a continuous piece of electric conductor, with the result that a simplified construction of a stator winding system is achieved. In combination with the mentioned interconnection unit, even more simplified arrangement and production of the same may be obtained. This results in further advantages, such as, for example, avoiding the introduction of different temperatures and/or possible damage to the insulation of the conductor during the laser welding or soldering that would otherwise occur, a higher current-carrying capacity of the conductor owing to the reduction of connection points, and, associated with this, a reduction in the reflection factor of the overall conductor.

Further advantages and embodiments may be found in the drawings and the corresponding description.

In the text that follows, the invention and exemplary embodiments are explained in more detail with reference to drawings. There, the same components are identified by the same reference signs in various figures. It is therefore possible that, when a second figure is being described, no detailed explanation will be given of a specific reference sign that has already been explained in relation to another, first figure. In such a case, it may be assumed for the embodiment of the second figure that, even without detailed explanation in relation to the second figure, the component identified there by this reference sign has the same properties and functionalities as explained in relation to the first figure. Further, for the sake of clarity, in some cases, not all the designations are shown in all of the figures, but only those to which reference is made in the description of the respective figure.

BRIEF DESCRIPTION OF THE DRAWINGS

FIG. 4 shows one embodiment of a sub-winding system having a plurality of winding chains.

DETAILED DESCRIPTION

In connection with components (e.g., coils or stator teeth), the term "adjacent" is intended to express the fact that, in the case of "adjacent components", there is, for example, no further such component between these two components but, for example, an empty intermediate space or possibly an object of a different kind.

For the sake of clarity, it is often the case that, in some of the figures, in cases in which components are present in multiple instances, not all the components illustrated are provided with reference signs.

Figure 1:
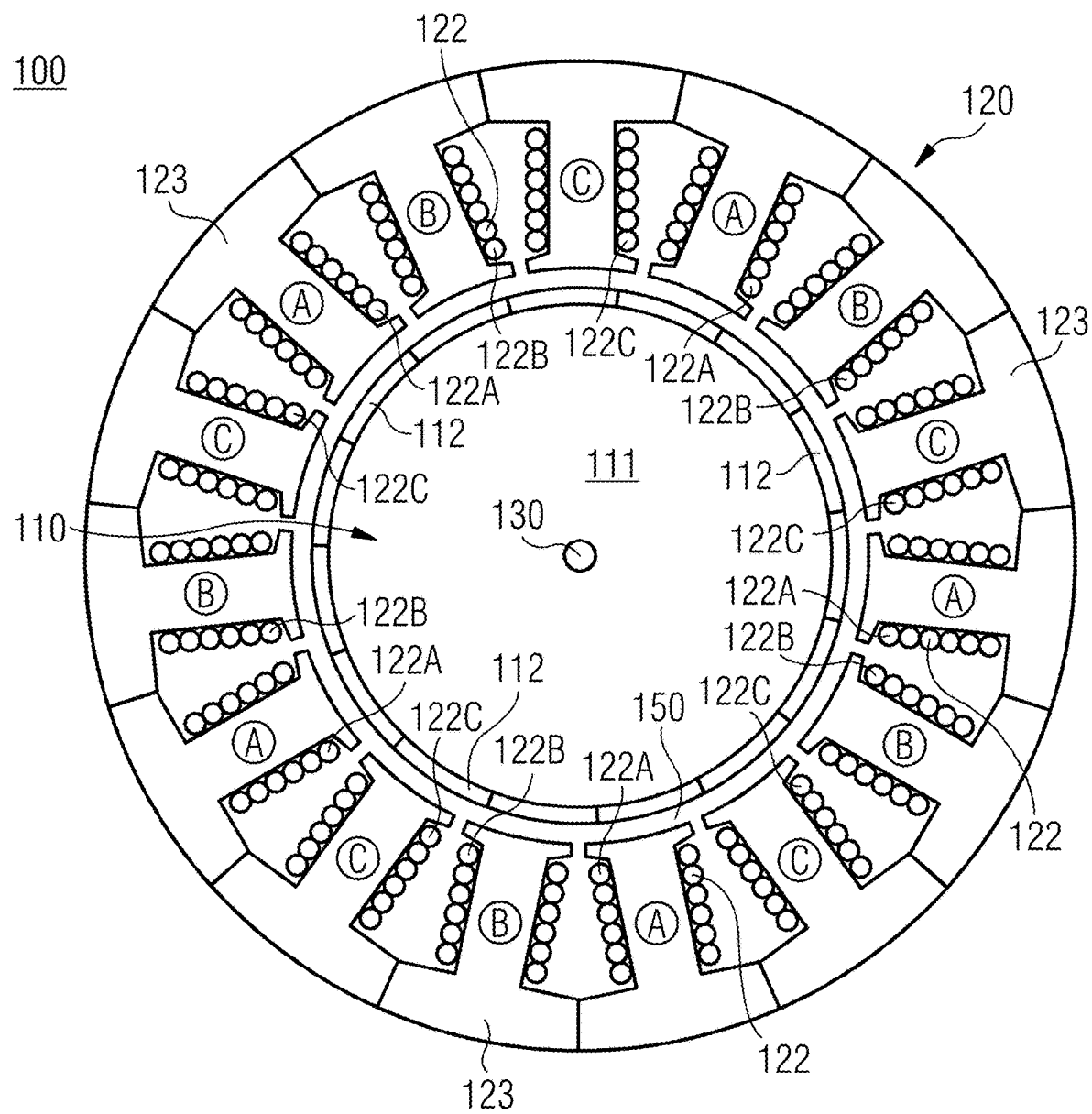
FIG. 1 shows a known electric machine.

FIG. 1 shows a highly simplified example of an electric machine 100 configured as an electric motor of the kind that may be used, for example, for an electric drive system. The electric machine 100, in a similar construction, may, in principle, also be operated as a generator. The construction of the machine 100 described below is greatly simplified and serves merely to illustrate the basic operation of the electric motor or electric machine. It may be assumed to be known that the various components of the machine 100 may be arranged differently, depending on the specific desired design of the electric machine 100, as a generator or as an electric motor and/or as, for example, a radial-flow or axial-flow machine with a rotor designed as an internal or external rotor, etc. In the case discussed here, however, the electric machine 100 is the machine with a rotor designed as an internal rotor that is of interest.

The electric motor 100 has a stator 120 with a stator winding system 121 and a substantially cylindrical rotor 110 (e.g., configured as an internal rotor), where the rotor 110 is arranged within the stator 120 and concentrically therewith and, in the operating state of the electric motor 100, rotating about an axis of rotation. The rotor 110, or a substantially cylindrical rotor main body 111 of the rotor 110, respectively, is connected to a shaft 130 for conjoint rotation therewith, so that a rotation of the rotor 110 may be transmitted via the shaft 130 to a component to be driven (not illustrated) (e.g., to a propeller of an airplane).

The stator 120 also has a plurality of stator teeth 123 and first magnetic devices or objects 122 implemented as windings 122 of the stator winding system 121. A respective winding 122 is positioned on a respective one of the stator teeth 123 of the stator 120 and has an electric current flowing through the respective winding 122 when the electric motor 100 is in the operating state, with the result that magnetic fields are generated. The rotor 110 has second magnetic devices or objects 112 that are configured as permanent magnets 112, for example, and may be arranged on a surface of the rotor main body 111 facing the stator 120.

The first windings 122 and the second magnetic windings 112, for example, are configured and spaced apart from one another by an air gap 150 such that the first windings 112 and the second windings 112, for example, interact electromagnetically with one another in the operating state of the electric motor 100. This concept, including the conditions for the formation and precise arrangement of the magnetic windings 112, 122, for example, or of the rotor 110 and stator 120, are known per se and are therefore not explained in more detail in the text which follows. In order to operate the electric machine 100 as an electric motor, electric currents are applied to the stator winding system 121 or the windings 122 thereof with the aid of a power source (not illustrated); the electric currents cause the windings 122 to generate corresponding magnetic fields that come to interact electromagnetically with the magnetic fields of the permanent magnets 112 of the rotor 110. This results in a torque acting in a tangential direction or circumferential direction on the permanent magnets 112, which, provided that the permanent magnets 112 are connected sufficiently firmly to the rotor main body 111, results in the rotor 110 and, conjointly therewith, the shaft 130 being set in rotation when the components are suitably configured and disposed in relation to one another.

This concept of forming the electric machine 100 as an electric motor may be assumed to be known. The alternative configuration and use of the electric machine 100 as a generator may also be assumed to be known. A current/voltage signal supplied in a known manner by the generator 100 is fed to a load (e.g., a battery) and processed accordingly there. On account of the familiarity of the concepts, the two forms of the electric machine 100 are not detailed any further in the text that follows.

The stator winding system 121 is typically of multi-phase design (e.g., with n=3 phases), where a plurality of windings 122 is assigned to a phase A, B or C, respectively. The set of windings 122A, 122B, and 122C assigned to a respective phase A, B and C, respectively, form a respective sub-winding system 121A, 121B, and 121C, respectively, of the stator winding system 121. In this case, the windings 122A, 122B, and 122C of a respective sub-winding system 121A, 121B, and 121C are connected in series, with the result that the electric current of the respective phase passes through the corresponding windings 122A, 122B, and 122C in succession. For this purpose, the windings 122A, 122B, or 122C assigned to the respective phase A, B, or C are to be connected to each other accordingly.

Conventionally, electrically conductive intermediate pieces or bridges, etc. are used to connect the individual windings 122 of a respective phase A, B, or C to one another. However, the corresponding effort required to produce all the connections is large, especially since the stator winding system 121 is generally configured for the application of multiphase currents. As a result, the intermediate pieces cannot be used to connect spatially adjacent windings 122 to one another, but rather windings 122 that are at a distance from one another are connected, with the result that the required intermediate pieces overlap at many points, leading to an increase in complexity.

Figure 2:
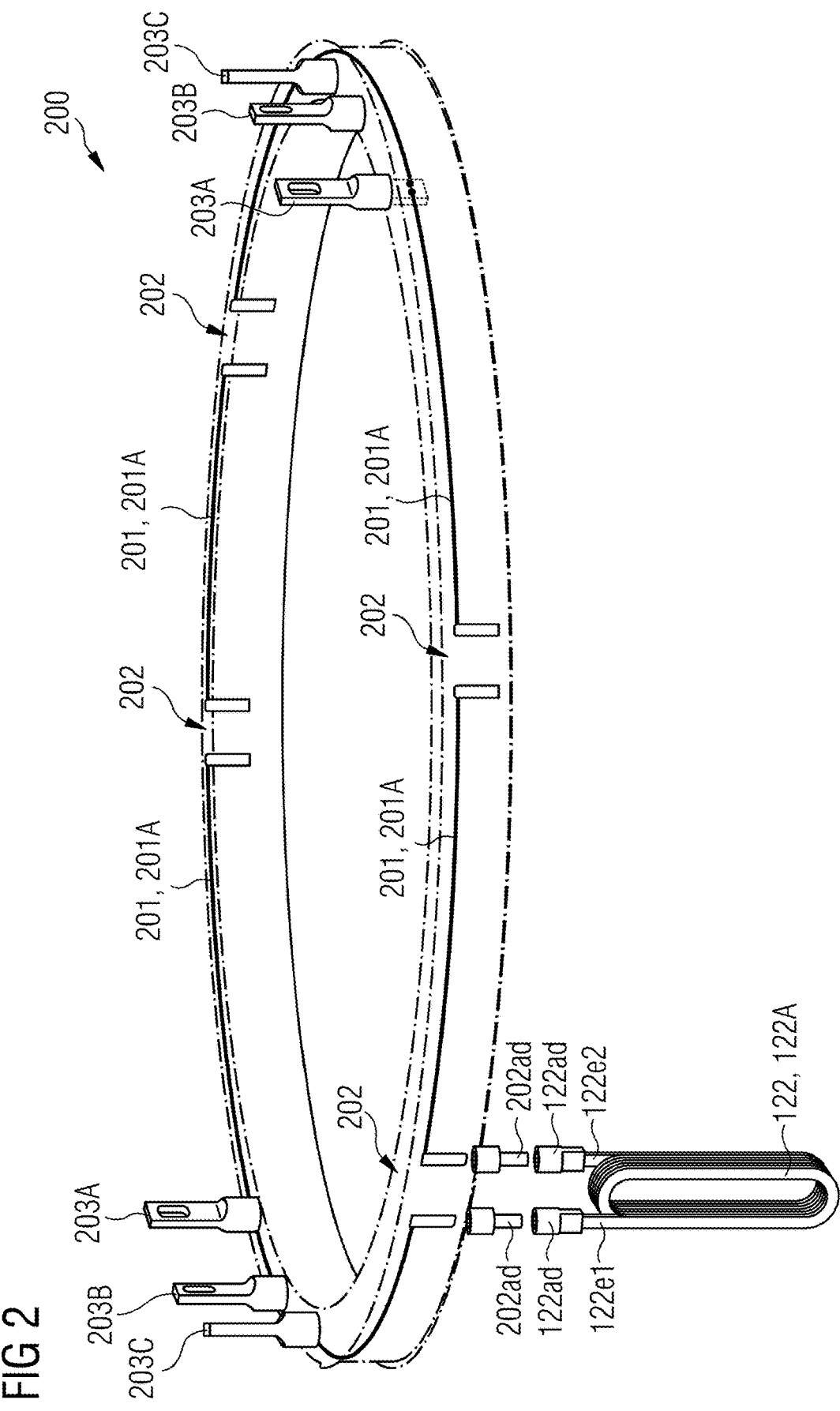
FIG. 2 shows an interconnection unit for electrically contacting windings of a stator winding system.

Alternatively, the interconnection unit 200 shown in FIG. 2 may be used, which has connectors 202 at suitable locations that may be connected in a simple manner to the corresponding terminals 122e1, 122e2 of the windings 122, possibly with the aid of corresponding adapter pieces 122ad and/or 202ad. For clarity, this is illustrated in FIG. 2 only for a single winding 122. The single winding 122 may also be replaced by one of the "winding chains" described below, the electric terminals of which would then be plugged onto the correspondingly positioned connectors 202.

The current provided by a current source in the case of use on an electric motor and that to be supplied to a load in the case of use on a generator, which in the example shown is to include three phases A, B, C, is conducted into or out of the interconnection unit 200 via corresponding main terminals 203A, 203B, 203C. Within the interconnection unit 200, electrical connections 201A, 201B, 201C that connect the connectors 202 of the interconnection unit 200 that are plugged onto the terminals 122e1, 122e2 of the windings 122 to be connected to one another are provided. Thus, with the aid of the interconnection unit 200, the windings 122A, 122B, and 122C associated with a respective phase A, B, and C, respectively, are connected to one another. In FIG. 2, for clarity, this is illustrated only for phase A (e.g., the components mentioned above and below with reference to FIG. 2 with reference signs 122B, 122C, 201B, 201C are not designated in FIG. 2, partly since the interconnection unit does not represent the essential point of the present embodiments).

The interconnection unit 200 does reduce the effort required for production of the stator winding system 121. However, owing to the large number of windings 122A, 122B, and 122C to be connected, respectively, the stator winding system 121 is comparatively complex to construct since the stator winding system 121 is to have a number of connectors 202 corresponding to the number of windings 122. Moreover, the electrical connections 201 running in the interconnection unit 200 are to be well insulated from one another.

According to the present embodiments, an improvement in this situation is achieved by the fact that at least some of the individual windings 122A, 122B, and 122C of a respective phase A, B, or C are connected to one another from the outset. This is explained below by way of example using phase A and the corresponding windings 122A. However, the same applies in a corresponding manner to the other phases.

Figure 3:
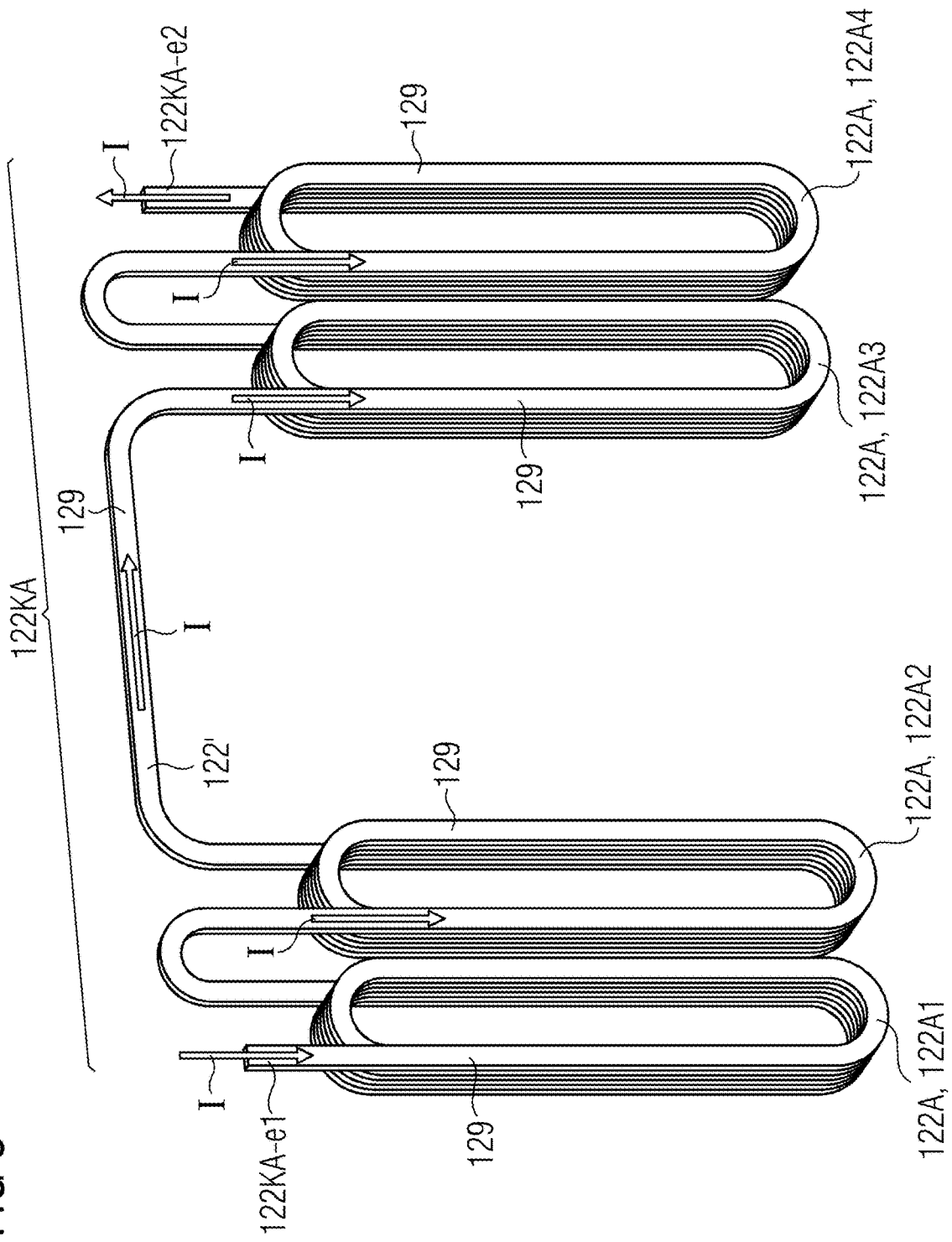
FIG. 3 shows a winding chain according to an embodiment.

FIG. 3 shows four windings 122A of the phase A of the stator winding system 121. For clarity, stator teeth 123, on which the windings 122A are to be positioned, or the stator 120 itself, are not illustrated. As viewed in a current flow direction I, the illustrated windings 122A are connected in series or serially. This is achieved by the windings 122A of phase A being formed from a continuous electric conductor 129, forming a winding chain 122KA of phase A. The feature that the conductor 129 is "continuous" provides, for example, that the winding chain 122KA thus formed is not connected by separate intermediate pieces or the like interposed between the windings 122A, but is wound from one piece of wire.

The winding chain 122KA shown in FIG. 3 has a first electric terminal 122KA-e1 and a second electric terminal 122KA-e2, via which electric current may be applied to the winding chain 122KA. Further, in the embodiment illustrated in FIG. 3, the winding chain 122KA, by way of example, includes four individual windings 122A1, 122A2, 122A3, 122A4, and a comparatively long connecting section 122' between the windings 122A2 and 122A3. This is to be understood as purely illustrative (e.g., the winding chain 122KA may also include more or fewer windings 122A, but no fewer than two windings 122A). The provision of the connecting section 122' and arrangement and dimensioning of the connecting section 122' are also merely illustrative.

As mentioned above, the stator winding system 121 is typically configured to carry a multi-phase current and accordingly includes a number of sub-winding systems 121A, 121B, 121C corresponding to the number of phases A, B, C to be carried. Each sub-winding system 121A, 121B, and 121C, respectively, may include one or more winding chains 122Kx where x=A, B, C. This is explained below, again with reference to phase A and sub-winding system 121A. The explanations apply accordingly to the other sub-winding systems 121B, 121C.

FIG. 4 shows, by way of example, and as a schematic diagram that the sub-winding system 121A may include four winding chains 122KA1, 122KA2, 122KA3, 122KA4. As seen in the current flow direction I, the winding chains 122KA1, 122KA2, 122KA3, 122KA4 are connected in series or serially. Each of the winding chains 122KA1,

122KA2, 122KA3, 122KA4 includes a plurality of individual windings 122Ai, for example, where i=1, 2, 3, 4, and may be constructed, for example, as illustrated in FIG. 3.

In each case, two winding chains 122KAj connected in series in the current flow direction I, where j=1, 2, 3, 4, are electrically connected to one another via connections 201 (e.g., with the aid of an appropriately configured interconnection unit 200 of the kind already mentioned above). In contrast to the interconnection of all windings 122 with the correspondingly complex interconnection unit 200 of FIG. 2, the adapted interconnection unit 200 that may be used may be much less complex, since the adapted interconnection unit 200 is to only have terminals (e.g., connectors) for the respective terminals 122KA-e1, 122KAe2, etc. of the winding chains 122KA, but not for the terminals of the individual windings 122. In principle, the adapted interconnection unit 200 has the same construction as the complex interconnection unit 200 of FIG. 2, except that the adapted interconnection unit 200 has fewer terminals 202, since, as mentioned, it is no longer necessary to contact each individual winding 122 with the interconnection unit 200, but only the winding chains 122Kx. The number of required terminals 202 of the interconnection unit is thus reduced by a factor corresponding to the number of individual windings 122 in the winding chains 122Kx. Since the interconnection unit 200 is not the subject matter of the present embodiments, a separate illustration of the adapted interconnection unit 200 is dispensed with.

For production of a stator winding system 121 including the explained winding chains 122Kx where x=A, B, C, etc., the required winding chains 122Kx, each having two or more individual windings 122, are first wound from a continuous electric conductor 129. In one embodiment, the windings 122 or the winding chains 122Kx may be wound, for example, as air coils or directly onto the corresponding stator teeth 123. Alternatively, it is also possible to produce the winding chains 122Kx using the needle winding process. In the case where the windings 122 are implemented as air coils, the winding chains 122Kx thus produced are then pushed onto the stator teeth 123.

After the positioning of the winding chains 122Kx on the stator teeth 123, respective terminals 122Kx-e1, 122Kx-e2 are electrically contacted such that the respective phase current I may flow in the desired sequence through the winding chains 122Kx of the respective sub-winding system 121x, where x=A, B, C. For contacting, it is possible, for example, to use the interconnection unit 200 that is plugged by terminals 202 onto the corresponding terminals 122Kx-e1, 122Kx-e2 of the winding chains 122Kx. Alternatively, the terminals 122Kx-e1, 122Kx-e2 of the winding chains 122Kx may be electrically contacted in a conventional manner (e.g., using appropriate intermediate pieces or bridges, etc.) to establish the sub-winding systems 121x.

In extreme cases, in which the sub-winding systems 121x each have only a single winding chain 122Kx, there is logically no need for the complex contacting of the terminals 122Kx-e1, 122Kx-e2. An interconnection unit 200 is likewise not required in this case. The terminals 122Kx-e1, 122Kx-e2 may essentially be connected directly to the power supply.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A stator winding system for a stator of an electric machine, the stator winding system comprising:
    a number of windings that are positionable on a number of stator teeth of the stator, respectively,
    wherein at least two windings of the number of windings that follow one another in a current flow direction of an electric current are connected in series, such that a winding chain is formed, and are formed from an electric conductor that is continuous in the current flow direction;
    wherein the winding chain is electrically connected to an interconnection unit assigned to the stator winding system,
    wherein the winding chain has a pair of electric terminals for application of the electric current,
    wherein the interconnection unit has paired contact points, by which the interconnection unit is electrically connectable to the at least two windings of the winding chain via the pair of electric terminals of the winding chain,
    wherein the stator winding system comprises a sub-winding system corresponding to a phase of the electric current, wherein the sub-winding system has a number of winding chains connected in series in the current flow direction.

2. The stator winding system of claim 1, wherein the stator winding system is configured for application of a single-phase or multi-phase electric current,
    wherein for the application of the single-phase or multi-phase electric current, the stator winding system further comprises a number of sub-winding systems corresponding to a number of phases of the single-phase or multi-phase electric current, and
    wherein each of the number of sub-winding systems comprises at least one winding chain.

3. The stator winding system of claim 2, wherein each sub-winding system of the number of sub-winding systems has a number of winding chains connected in series in the current flow direction.

4. The stator winding system of claim 3, wherein the number of winding chains of the respective sub-winding system are electrically connected to one another via the interconnection unit assigned to the stator winding system.

5. The stator winding system of claim 4, wherein each winding chain of the number of winding chains has a pair of electric terminals for application of the electric current,
    wherein the interconnection unit has paired contact points, by which the interconnection unit is electrically connectable to the pair of electric terminals of the respective winding chain, and
    wherein the electrical connections are provided on or in the interconnection unit, each of the electrical connections connecting one contact point of a first pair of contact points to one contact point of a second pair of contact points, such that a winding chain, arranged at the first pair of contact points, of one sub-winding system of the number of sub-winding systems is electrically connected to a further winding chain, arranged at the second pair of contact points, of the one sub-winding system.

6. The stator winding system of claim 4, wherein the paired contact points of the interconnection unit and the electric terminals of the number of winding chains are configured to match such that the paired contact points and the electric terminals are pluggable onto one another.

7. A method for producing a stator winding system for a stator of an electric machine, the stator winding system comprising a number of windings that are positionable on a number of stator teeth of the stator, respectively, wherein at least two windings of the number of windings that follow one another in a current flow direction of an electric current are connected in series, such that a winding chain is formed, and are formed from an electric conductor that is continuous in the current flow direction, wherein the winding chain is electrically connectable to an interconnection unit assigned to the stator winding system, wherein the stator winding system comprises a sub-winding system corresponding to a phase of the electric current, and wherein the sub-winding system has a number of winding chains connectable in series in the current flow direction, the method comprising:
producing a number of winding chains, the producing of the number of winding chains comprising shaping the continuous electric conductor for each winding chain of the number of winding chains, such that the continuous electric conductor forms the number of windings of the respective winding chain, wherein a winding chain of the number of winding chains has a first electrical terminal and a second electric terminal for application of the electric current; and
plugging the interconnection unit onto the first electrical terminal and the second electric terminal of the winding chain after the producing of the number of winding chains, such that the winding chain is electrically connected to the interconnection unit.

8. The method of claim 7, wherein the stator winding system is configured for application of a single-phase or multi-phase electric current,
wherein for the application of the single-phase or multi-phase electric current, the stator winding system is fitted with a number of sub-winding systems corresponding to a number of phases of the single-phase or multi-phase electric current, and
wherein each sub-winding system of the number of sub-winding systems is fitted with at least one winding chain of the number of winding chains.

9. The method of claim 8, wherein each sub-winding system of the number of sub-winding systems is fitted with a number of winding chains connected in series in the current flow direction.

10. The method of claim 9, wherein the winding chains of a respective sub-winding system of the number of sub-winding systems are electrically connected to one another via the interconnection unit assigned to the stator winding system.

11. The method of claim 10, wherein each winding chain of the number of winding chains has a first electrical terminal and a second electric terminal for application of the electric current, wherein the interconnection unit is plugged onto the first electrical terminals and the second electric terminals after the producing of the number of winding chains, such that the respective winding chains are electrically connected to one another to form a respective sub-winding system.

12. The method of claim 11, wherein the interconnection unit is plugged onto the first terminal and the second terminal after the winding chains have been positioned on the stator teeth.

13. The method of claim 7, further comprising winding the continuous electric conductor directly onto the respective stator teeth.

14. The method of claim 7, further comprising:
forming the windings of the respective winding chain into air coils; and
positioning the air coils on the respective stator teeth after the forming of the windings into the air coils.

15. The method of claim 7, wherein the number of winding chains are produced by a needle winding process.

* * * * *